United States Patent [19]
Turner

[11] Patent Number: 5,853,233
[45] Date of Patent: *Dec. 29, 1998

[54] CRAWLER TRACK ASSEMBLY

[76] Inventor: Robert John Turner, 13 Cullen Street, Warwick, Australia

[ * ] Notice: The terminal 61 months of this patent has been disclaimed.

[21] Appl. No.: 439,371

[22] PCT Filed: Mar. 17, 1989

[86] PCT No.: PCT/AU89/00106

§ 371 Date: Sep. 14, 1992

§ 102(e) Date: Sep. 14, 1992

[87] PCT Pub. No.: WO89/08577

PCT Pub. Date: Sep. 21, 1989

[30] Foreign Application Priority Data

Mar. 18, 1988 [AU] Australia ................................. PI7317

[51] Int. Cl.$^6$ .................................................. B62D 55/18
[52] U.S. Cl. ........................... 305/123; 305/195; 305/202
[58] Field of Search ................................. 305/24, 56, 57, 305/58 R, 52, 120, 121, 122, 123, 127, 193, 195, 198, 199, 202, 203, 192, 194, 124, 240

[56] References Cited

U.S. PATENT DOCUMENTS

| | | | |
|---|---|---|---|
| 1,319,120 | 10/1919 | Schutz | 305/123 |
| 2,838,345 | 6/1958 | Miller | 305/121 |
| 3,032,376 | 5/1962 | Blazek et al. | 305/186 |
| 3,492,054 | 1/1970 | Boggs et al. | |
| 3,547,502 | 12/1970 | Howard | 384/44 |
| 3,567,294 | 3/1971 | Simpson et al. | 305/195 |
| 3,731,551 | 5/1973 | Nelson | 305/202 X |
| 4,050,750 | 9/1977 | Yoshihashi et al. | 305/202 |
| 4,149,758 | 4/1979 | Livesay | |
| 4,191,431 | 3/1980 | Roley et al. | 305/123 |
| 4,199,202 | 4/1980 | Maeda | 384/432 |
| 4,222,616 | 9/1980 | Brewer | 305/202 |
| 4,636,014 | 1/1987 | Dennison et al. | 305/202 |
| 5,069,509 | 12/1991 | Johnson et al. | 305/204 |
| 5,069,510 | 12/1991 | Cory | 305/202 X |

FOREIGN PATENT DOCUMENTS

| | | |
|---|---|---|
| 145427 | 9/1950 | Australia . |
| 256720 | 7/1963 | Australia . |
| 008959 | 9/1980 | European Pat. Off. . |
| 56-51681 | 9/1979 | Japan . |
| 58-135521 | 2/1984 | Japan . |
| 60-46387 | 4/1985 | Japan . |
| 61-46774 | 3/1986 | Japan . |
| 1373794 | 11/1974 | United Kingdom . |

*Primary Examiner*—Russell D. Stormer
*Attorney, Agent, or Firm*—Merchant, Gould, Smith, Edell, Welter & Schmidt, P.A.

[57] ABSTRACT

A crawler track mechanism including a plurality of track plates each mounted on track chain links, the chain links being interconnected by bushes having an outer sleeve rotatably journalled on an inner sleeve which in turn is rotatably journalled on a central cylindrical pin). A drive sprocket, and if necessary an idler sprocket, includes recesses having a semi-circular cross section to receivably locate the bushes. The bushes, by virtue of the relative rotation between the pin, the inner sleeve and the outer sleeve, reduce friction and wear between the drive sprocket and the chain bushes.

9 Claims, 4 Drawing Sheets

CRAWLER TRACK ASSEMBLY

THIS INVENTION is concerned with improvements in or relating to crawler track assemblies.

More particularly the invention is concerned with an improved bush for connection of crawler track chain links and a crawler track system employing such links.

The most commonly used bush for joining crawler track links comprises a cylindrical pin with an annular sleeve rotatably mounted thereon in a plain bearing relationship. In assembling a crawler track chain, the sleeve is press fitted into aligned apertures in opposing sides of one end of a chain link. An adjacent link is then connected by passing the central pin through the sleeve and press fitting the pin in aligned apertures in the spaced jaws of the adjacent link.

Accordingly while the pin and sleeve are relatively rotatable to some degree as adjoining links are flexed, the pin and sleeve are not rotatable relative to respective links in which they are press fitted.

Such prior art chain bushes are particularly susceptible to wear. As a crawler tractor moves across a ground surface the tension in the track is borne by the pin and sleeve. Constant tension combined with relative rotation as the links flex while moving around the drive sprocket and idler gives rise to substantial wear on the outer surface of the pin and the inner surface of the sleeve.

In addition, the outer surface of the sleeve is subjected to substantial wear from the drive sprocket teeth due to the combined effects of tension and the fact that the surface of the sleeve grinds against the sprocket teeth as the chain links flex around the sprocket. Generally speaking it is preferred that the bushes wear preferentially over the sprocket as it is less expensive to replace chain bushes than drive sprockets.

Rebushing of crawler track chains is a function often carried out in the field and this task is extremely expensive and time consuming. Apart from the actual cost to an operator of the re-bushing of a crawler track chain system, a loss in earning capacity results from having the crawler tracked vehicle out of operation for two or three days while the-track maintenance procedure is being carried out.

In order to alleviate the problems of crawler track maintenance due to worn chain bushes, it has been proposed to use a bush comprising a central pin and a sleeve rotatably journalled on the pin by a roller bearing assembly. Although such bushes show a reduction in internal wear between the pin and sleeve, there still exists the problem of wear between the bushes and the drive sprocket.

It is an aim of the present invention to overcome or alleviate the problems associated with prior art crawler track chain bushes and to provide an improved crawler track assembly.

According to one aspect of the invention there is provided a bush assembly for a crawler track chain mechanism, said bush assembly comprising a cylindrical pin having rotatably journalled thereon a first sleeve member and a second sleeve member rotatably journalled on said first sleeve member, said cylindrical pin and said first sleeve member each being adapted for frictional engagement in respective ends of a crawler track chain link.

Suitably said first sleeve member is rotatably journalled on said cylindrical pin by a first bearing means.

Suitably said second sleeve member is rotatably journalled on said first sleeve member by a second bearing means.

The first and second bearing means may comprise plain bearing surfaces or roller bearings such as needle roller bearings or a combination thereof.

Preferably said second sleeve member is rotatable in use between opposed yoke arms of a crawler track chain link.

According to another aspect of the invention there is provided a crawler track mechanism for vehicles, said mechanism comprising a track including track plates mounted on crawler track chain links, said chain links being pivotally interconnected by bushes according to a first aspect of the invention, and, a drive sprocket adapted to receivably locate in recesses between adjacent sprocket teeth rotatable outer sleeves associated with respective chain bushes.

Suitably the recesses between adjacent sprocket teeth are semi-circular in cross-sectional shape.

The crawler track mechanism may also include a lower track guide in the form of an inverted channel adapted to locate peripheral edge portions of said track chain bushes.

Most preferably said inverted channel comprises a load bearing member adapted to engage a circumferential surface of at least some of said track chain bushes to support at least portion of the gravitational mass of a vehicle embodying said track mechanism.

In order that the invention may be more clearly understood, a preferred embodiment will now be described with reference to the accompanying drawings in which.

Figure 1:
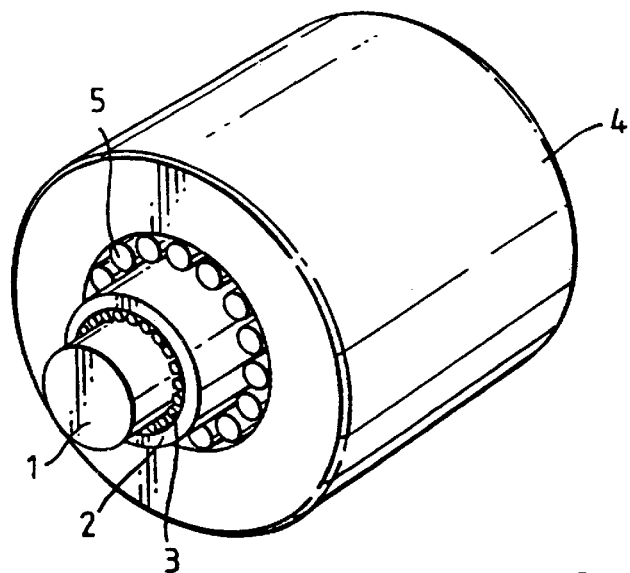
FIG. 1 illustrates a sectioned track chain bush assembly.

In FIG. 1 the bush comprises a solid central pin 1 on which a first sleeve 2 is rotatably journalled by a needle roller race 3. A second sleeve 4 is rotatably journalled on first sleeve 2 by a further needle roller race 5.

Needle roller races 3 and 5 comprise conventional grease filled caged races with outer seals to prevent ingress of foreign matter and egress of the grease packing. For the sake of clarity the race cages and seals are omitted.

Figure 2:
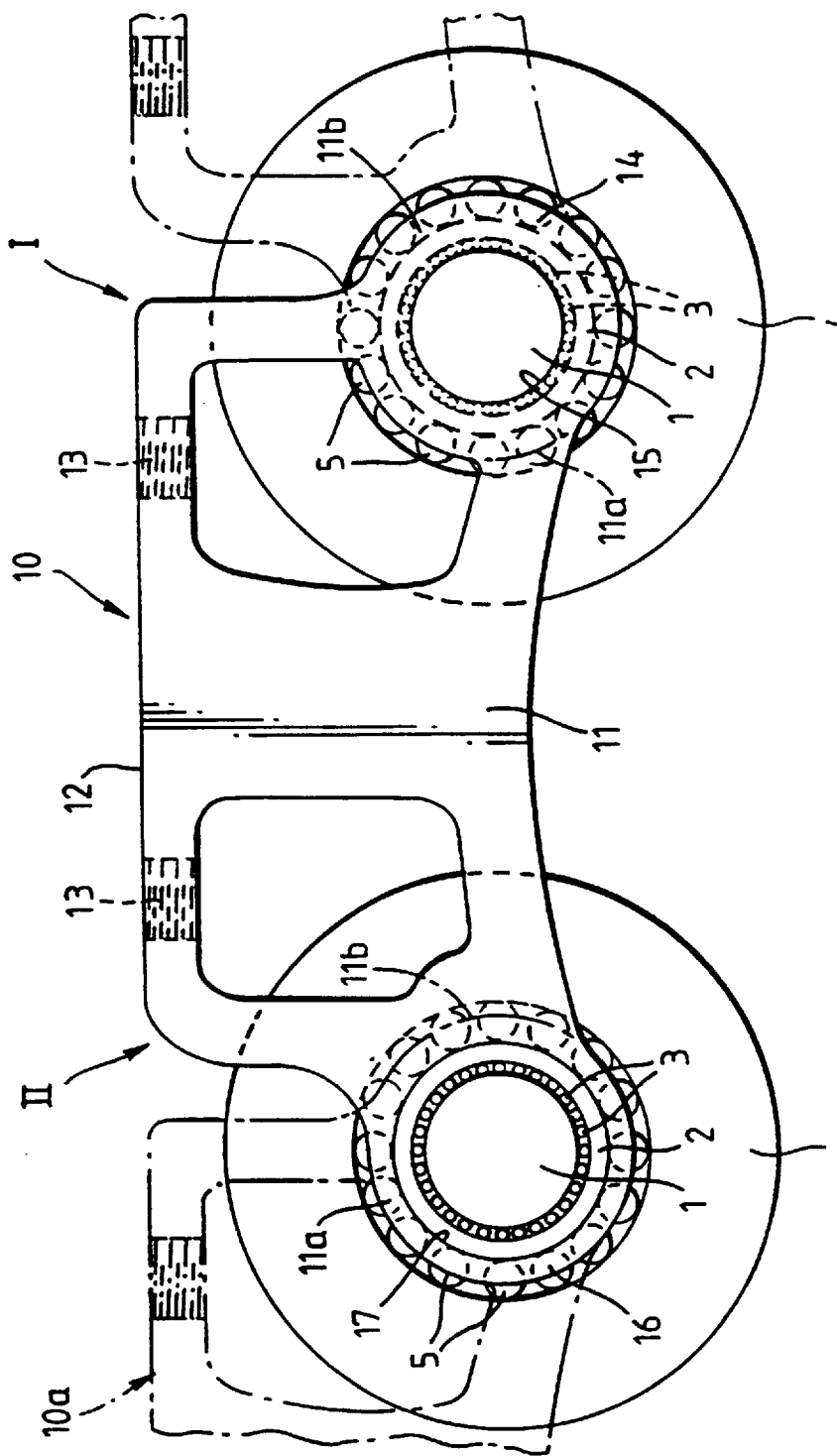
FIG. 2 illustrates a side elevation of a track chain link fitted with bushes according to the invention.

FIG. 2 shows a chain link 10 which comprises a pair of spaced side members 11 joined along their lower edges by a transverse base 12 to which track plates (not shown) are releasably mounted by bolts passing through apertures 13.

One end 14 of the chain link 10 includes aligned bores 15 into which central pin 1 of the bush assembly of FIG. 1 is frictionally engaged by press fitting or the like.

Figure 4:
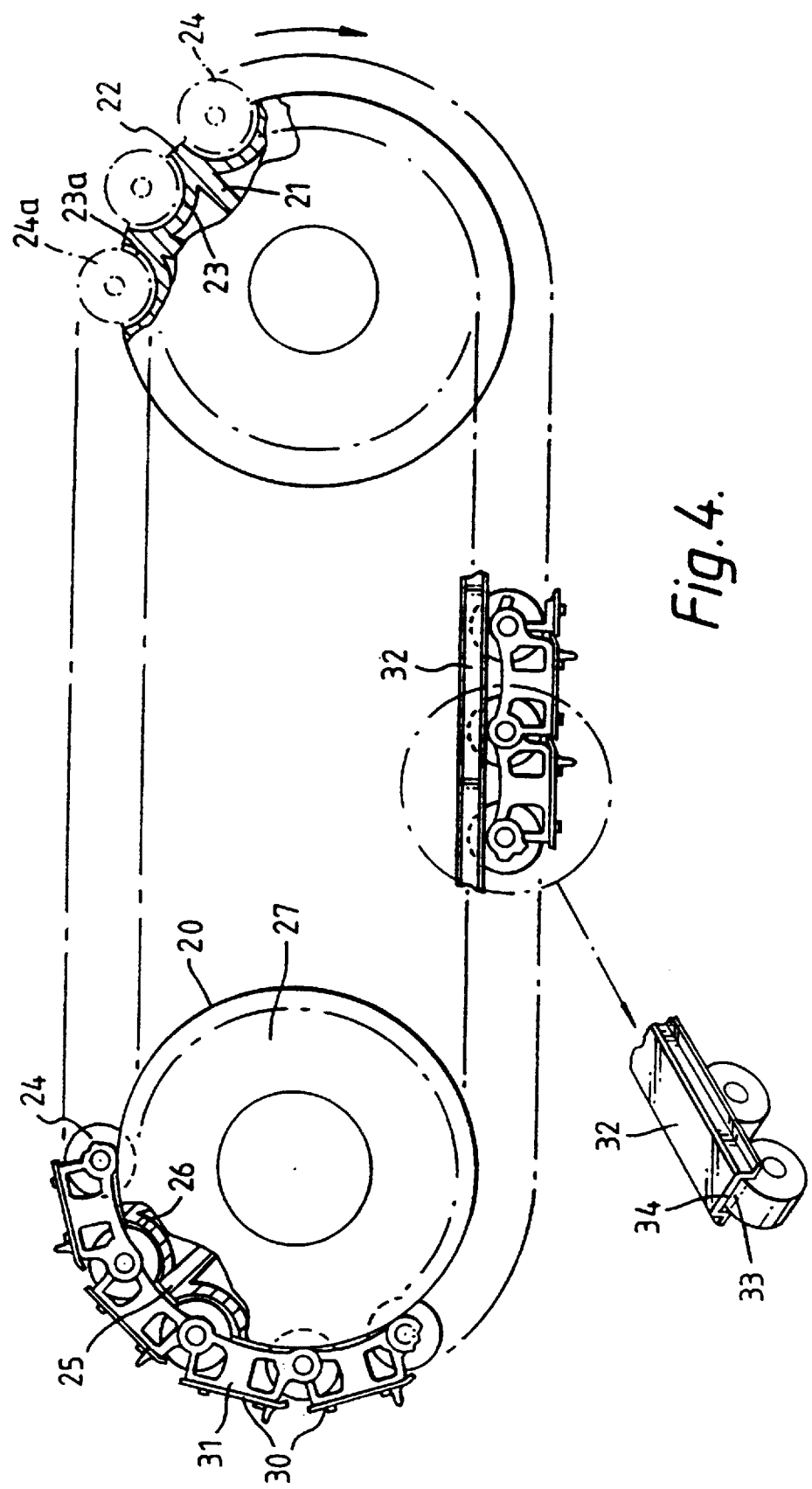
FIG. 4 shows schematically a crawler track mechanism according to the invention.

At the opposite end 16 of chain link 10 aligned bores 17 of a somewhat larger diameter are adapted to frictionally engage the inner sleeve 2 of the bush assembly. Outer sleeve 4 is thus able to rotate on inner sleeve 2 between the opposed side members 11 of chain link 10. The width of the chain link 10 in the region 11a of side members 11 is narrower than that of region 11b such that the corresponding region 11b of an adjacent chain link 10a lies outside region 11a when the axes of respective bores 15,17 are aligned to receive pin 1 and inner sleeve 2 respectively. Such an arrangement is illustrated in FIG. 4.

Figure 3:
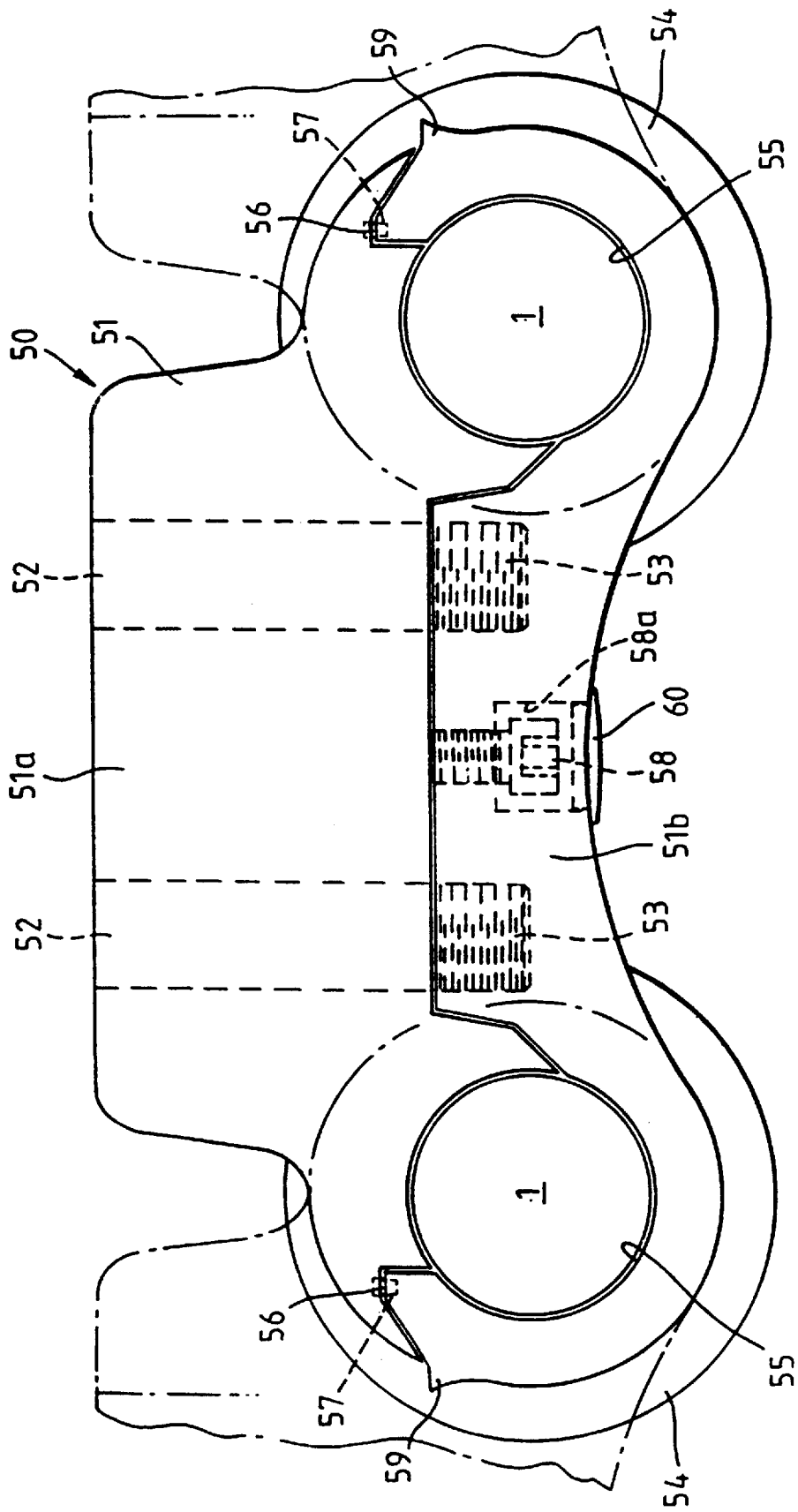
FIG. 3 shows an alternative embodiment of the chain link of FIG. 2.

FIG. 3 shows an alternative embodiment of the of the chain link 10 of FIG. 2.

In FIG. 3 there is shown an alternative embodiment of the chain link illustrated in FIG. 2.

The chain link 50 as illustrated comprises a body 51 formed from cast or forged metal and is formed as two mating portions 51a, 51b which are clamped together by bolts (not shown) which pass through track plates (not shown) via apertures 52 in body portion 51a to threaded apertures 53 in body portion 51b. The clamping bolts serve to mount the track plates to the chain links and at the same time to clamp the body portions 51a, 51b together.

When body portions 51a, 51b are separated, bush assemblies 54 of the type shown in FIG. 1 may be mounted in body 51 by locating the free ends of central pins 1 respectively within the laterally opposed partially circular jaws 55 in body portion 51b. When the track plate and body portions 51a, 51b are clamped together the free ends of the central pins 1 of the bush assemblies 54 are firmly clamped into the chain link 51.

To alleviate the risk of longitudinal spreading of jaws 55 one or more tapered pins 56 may extend from body portion 51a into tapered recesses 57 in body portion 51b or vice versa. Alternatively a key may be located in transversely extending keyway recessed into body portions 51a, 51b or body portions 51a, 51b may be provided respectively with complementary shouldered abutments.

To facilitate separation of body portions 51a, 51b after prolonged periods of use a hex headed grub screw 58 or the like may be located in a threaded aperture 58a and by use of an Allen key or the like, a separating force may be applied between body portions 51a, 51b. If required, shouldered abutments 59 may be provided on body portions 51b to assist separation by tapping these abutments 59 with a hammer whilst tensioning grub screw 58. A plastic dust cap 60 is employed to seal aperture 58a against ingress of dirt or moisture.

FIG. 4 shows a partial schematic view of a crawler track mechanism according to the invention.

The crawler track mechanism comprises an idler 20 and a drive sprocket 21.

The drive sprocket 21 may comprise a plurality of generally radially directed teeth 22 having therebetween recesses 23 of semi-circular cross sectional shape, the recesses being of dimensions to receivably locate the chain bushes 24. The idler 20 comprises a sprocket member similar to the drive sprocket except that the teeth 25 are separated by shallower recesses 26 having a part-circular cross section to receivably locate the chain bushes 24.

Preferably both the idler 20 and the drive sprocket 21 include side walls on recesses 23,26 (as generally shown at 27 on idler 20) to assist in guidance of the track chain around the idler and drive sprocket.

The crawler track comprises a plurality of track plates 30 each attached to a chain link 31 to form an endless chain when links 31 are pivotally connected by bushes 24.

As the tractor or the like moves across a ground surface the exterior surface of a bush 24a engages the side of a tooth 25a and as sprocket 21 continues to rotate in the direction indicated by the arrow, bush 24a rolls into recess 23a with the surfaces of bush 24a and recess 23a in rolling contact. Once located in the recess 23a, the surface of the bush 24a remains stationary relative to the surface of the recess 23a even although adjacent links of the track chain pivot relative to each other as they move around the sprocket 21. As the sprocket passes through 180 of revolution the bush 24a leaves its respective recess 23a with the same rolling motion with which it previously entered the recess.

The initial and final rolling movements of the bushes as they respectively engage and disengage either the idler or drive sprocket, combined with their stationary engagement whilst moving between the engaged and disengaged positions substantially minimizes wear on both the outside surface of the bushes as well as the drive sprocket and idler.

The ground engaging portion of the track may be supported on conventional idler/guide rollers (not shown) or the track may be supported by a support member 32 in the form of an inverted channel.

The width and depth of the channel recess 33 are chosen to accommodate the peripheral portions of the bushes 24 whereby the substantial portion of the weight of the tractor is supported by rolling engagement between bushes 24 and the floor 34 of channel member 32.

The track system according to this aspect of the invention demonstrates a substantially reduced level of energy consuming frictional drag when compared with conventional crawler track systems. Accordingly apart from reduced maintenance costs due to reduced wear, the present invention also offers the advantage of reduced fuel costs in operation of a crawler tracked vehicle.

Figure 5:
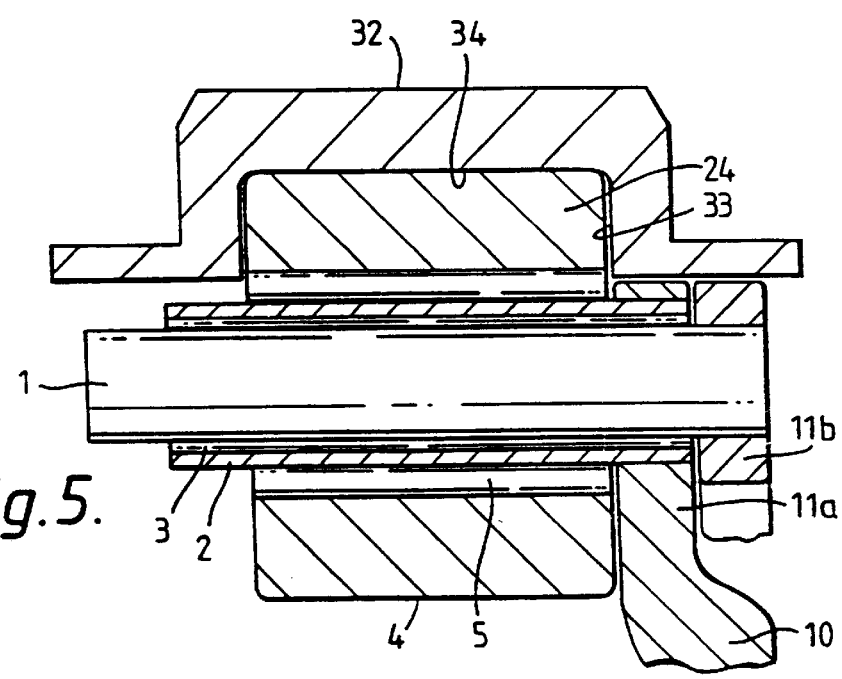
FIG. 5 shows a cross sectional view of a track guidance and support member in association with a track chain link and bush assembly.

FIG. 5 shows a part cross-sectional view of the channelled support member 32 chain link 10 and bush assembly of FIG. 1 illustrating the manner in which the bushes 24 travel to support the mass of the tracked vehicle.

The various aspects of the invention may be incorporated in a crawler tracked vehicle during construction. Alternatively a vehicle having a conventional crawler track system may be readily retro-fitted with a system according to the invention by replacement of the drive sprocket and idler. Additionally the channelled support member 32 may be adapted to be bolted directly into existing bolt holes for the lower track idler/guide rollers.

Figure 6:
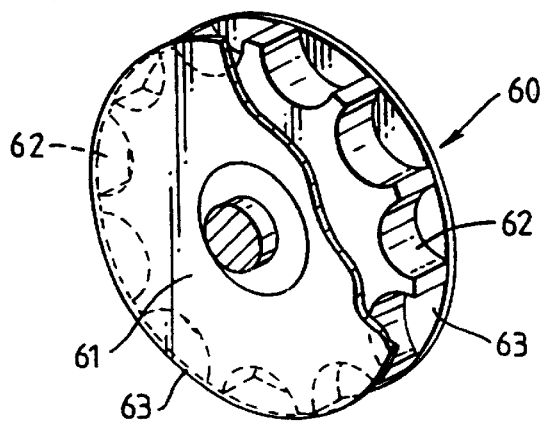
FIG. 6 shows a drive or idler sprocket.

FIG. 6 shows a drive or idler sprocket 60 which may be utilized with the invention.

The sprocket 60 may be fabricated from a machined or cast central member 61 having a plurality of spaced semi-circular apertures 62 about its periphery, the central member 61 being sandwiched between annular cheek plates 63. Alternatively the sprocket of FIG. 6 may be cast as an integral structure.

It will be clear to a skilled addressee that the chain link/bush assemblies of the present invention facilitate simpler and more economic in-field maintenance of crawler track assemblies and substantially minimize operational down time of crawler track vehicles.

It further will be appreciated by a skilled addressee that many variations and modifications may be made to the invention in its various aspects without departing from the spirit and scope thereof.

I claim:

1. A crawler track mechanism for tracked vehicles of a type that include a drive sprocket and an idler sprocket, said crawler track mechanism comprising a plurality of track links and a plurality of bush assemblies, said track links pivotally connected at respective ends to form a continuous track, each said track link comprising a pair of spaced side members joined along their lower edges by a transverse base, said side members including at opposed ends thereof, aligned apertures to receivably locate a respective said bush assembly, each said bush assembly comprising a cylindrical pin having rotatably journalled thereon a first sleeve member and a substantially cylindrical second sleeve member rotatably journalled on said first sleeve member, each said track link being pivotally interconnected to an adjacent track link by a respective said bush assembly, and each said track link comprising first and second releasably engageable body members which clampingly engage respective said bush assemblies in said aligned apertures, whereby disengagement between said first and second body members of adjacent track links permits removal of the bush assembly pivotally interconnecting said adjacent track links.

2. A crawler track mechanism as claimed in claim 1 wherein said first and second body members together comprise opposed jaw members which cooperate to form said aligned apertures in said side members of a track link.

3. A crawler track mechanism as claimed in claim 2 including retaining members extending between respective opposed jaw members.

4. A crawler track mechanism as claimed in claim 1 including a separating mechanism to enable application of a force to disengage said first and second body members.

5. A crawler track mechanism as claimed in claim 4 wherein said separating mechanism comprises a screw threaded member threadably located in one of said first or second body members and, upon rotation, being adapted to bear on another of said body members to apply a separating force thereto.

6. A crawler track mechanism as claimed in claim 1 wherein said first and second body members are releasably engaged by bolts extending therebetween.

7. A crawler track mechanism as claimed in claim 6 wherein track plates are secured to respective track links by said bolts.

8. A crawler track mechanism as claimed in claim 1 wherein pivotal interconnection between said adjacent track links is effected by frictional engagement between said cylindrical pin and respective aligned apertures in a track link and frictional engagement between said first sleeve member and respective aligned apertures of an adjacent track link.

9. A crawler track mechanism as claimed in claim 1 including a support member in the form of an inverted channel, said support member adapted in use to support at least a portion of the gravitational mass of a vehicle in a region between respective drive and idler sprockets.

* * * * *